Aug. 28, 1928.

1,682,125

D. E. HENNESSY

METHOD OF MAKING RUBBER TUBES

Original Filed April 28, 1922

DANIEL E. HENNESSY
INVENTOR

BY
ATTORNEY

Patented Aug. 28, 1928.

1,682,125

UNITED STATES PATENT OFFICE.

DANIEL E. HENNESSY, OF AKRON, OHIO, ASSIGNOR TO THE FISK RUBBER COMPANY, OF CHICOPEE FALLS, MASSACHUSETTS, A CORPORATION OF MASSACHUSETTS.

METHOD OF MAKING RUBBER TUBES.

Original application filed April 28, 1922, Serial No. 557,206. Divided and this application filed June 1, 1926. Serial No. 112,849.

My invention relates to the manufacture of rubber tubes and more particularly to tubes of the character used as inner tubes in pneumatic tire casings. In the manufacture of such tubes it has been customary to prevent blowing of the tube during vulcanization by binding the ends of the tube to the mandrel with a wrapping of fabric tape. In my copending application, Serial Number 557,206, filed April 28, 1922, of which this application is a division, I have claimed a specific form of metal clamp which replaces the customary fabric wrapping. It is the object of my present invention to provide a method which will facilitate the use of clamps of the type claimed in my said application, permitting a simplified clamp structure and securing greater uniformity of results.

While for the purpose of illustration I herein describe my method in conjunction with the clamp of my application above mentioned, modified as therein suggested, it will be understood that my method applies equally to any mechanical clamp used for clamping the ends of tubes to curing mandrels.

Figure 1:
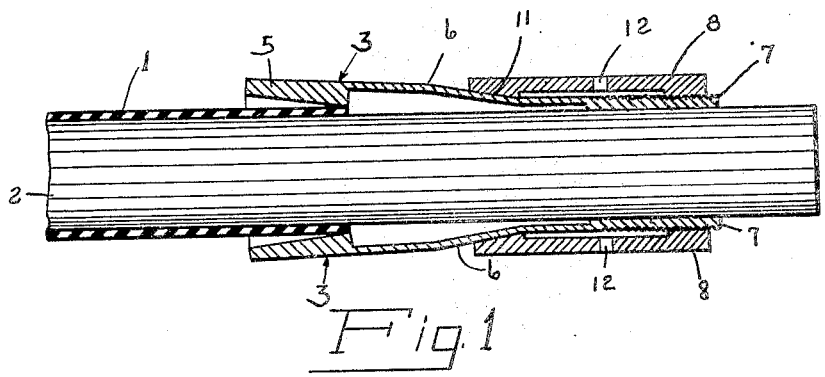
Figure 2:
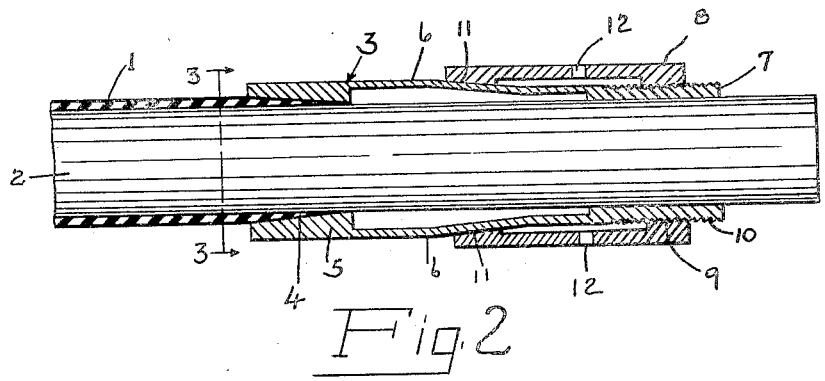
Figure 3:
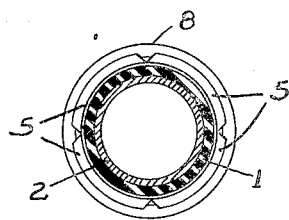

In the accompanying drawings,

Figure 1 shows an uncured rubber tube on a mandrel with a clamp in position ready to grip the ends of the tube, Figure 2 is a similar view showing the tube clamped to the mandrel, and Figure 3 is a section on line 3—3 of Figure 2.

In carrying out my invention, as illustrated, I form or position the inner tube 1 on the mandrel 2 as shown in Figure 1, and provide a suitable clamp indicated generally at 3 to force the ends of the tube into sealed relation with the mandrel and at the same time skive or mold the end of the tube as indicated at 4 in Figure 2. Before applying the clamping pressure I preheat that portion of the tube which is to be engaged by the clamping means. This may conveniently, and preferably, be done by heating the jaws of the clamp, or the entire clamp, before applying it. The clamp shown for the purpose of illustration comprises a plurality of bevel edged jaws 5 adapted, in closed position, to surround the end of the tube as shown in Figure 3. The inside surfaces of the jaws are inclined as shown in Figures 1 and 2 and the jaws are connected by spring arms 6 to a supporting collar 7. In order to increase the pressure of the jaws I provide a clamping ring 8 screw threaded at 9 to engage cooperating screw threads 10 on the exterior of collar 7. Clamping ring 8 is provided with a cam surface 11 engaging spring arms 6 so that rotation of ring 8 by a tool engaging the apertures 12 will move it outwardly along arms 6 to thus increase the pressure on jaws 5 as desired. Ring 8 may be eliminated if the additional pressure is not desired.

By preheating the end portion of the tube through heating the clamp or otherwise, the tube stock is softened, permitting the rubber to flow relatively quickly and evenly to the shape shown in Figure 2. The softened stock tends to make a close contact with the surface of the mandrel and the pressure required to maintain the seal may be less than when the stock is cold. Also the pressure required to mold the skive, is substantially less and as the stock when molded in a softened condition has less tendency to return to its original shape the pressure maintained may be less. When applied according to my method the pressure required does not substantially exceed that necessary to maintain the end of the tube in complete contact with the mandrel and the contact of the softened stock with the mandrel is more complete than where a clamp is applied in the conventional manner.

I claim:

1. The method of treating rubber tubes upon a mandrel preparatory to vulcanization which comprises heating the end portions of the tube to soften the rubber and clamping said portions to the mandrel.

2. The method of manufacturing rubber tubes which comprises positioning the tube upon a mandrel and applying clamping means to the ends of the tube in the presence of a softening heat preparatory to vulcanizing the tube.

3. The method of manufacturing rubber tubes which comprises positioning the tube on a mandrel and applying a molding clamp adapted to exert sealing pressure to the ends of the tube in the presence of a softening heat preparatory to vulcanizing the tube.

4. The method of curing rubber tubes upon a mandrel which comprises applying a preheated clamp to the ends of the tube preparatory to vulcanizing the tube.

5. The method of manufacturing rubber tubes which comprises positioning the tube upon a mandrel, and applying a heated molding clamp adapted to exert sealing pressure to the ends of the tube preparatory to vulcanizing the tube.

In testimony whereof I have signed my name to the above specification.

DANIEL E. HENNESSY.